B. E. DOHNER. AND A. J. HUFF.
ROLLER BEARING.
APPLICATION FILED MAR. 10, 1919.

1,340,941.

Patented May 25, 1920.

Burt E. Dohner and
Albert J. Huff
INVENTORS.
BY R. J. McCarty
their ATTORNEY.

UNITED STATES PATENT OFFICE.

BURT E. DOHNER AND ALBERT J. HUFF, OF DAYTON, OHIO.

ROLLER-BEARING.

1,340,941.  Specification of Letters Patent.  Patented May 25, 1920.

Application filed March 10, 1919. Serial No. 281,764.

*To all whom it may concern:*

Be it known that we, BURT E. DOHNER and ALBERT J. HUFF, citizens of the United States, residing at Dayton, in the county of Montgomery and State of Ohio, have invented certain new and useful Improvements in Roller-Bearings, of which the following is a specification.

Figure 1:
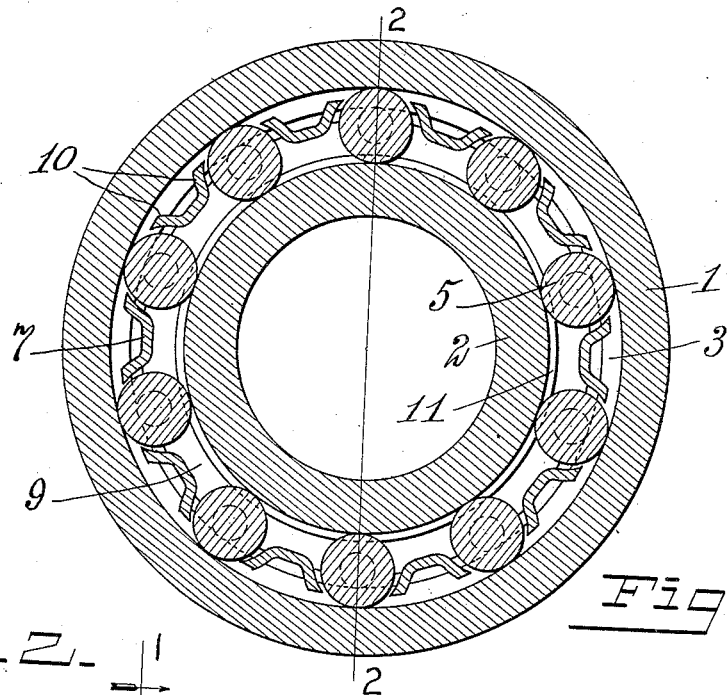
Figure 2:
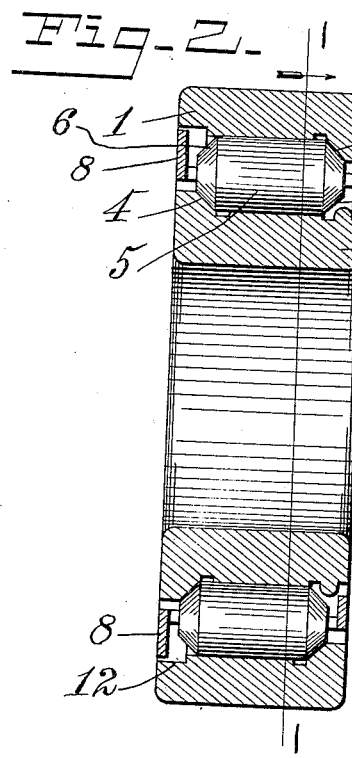
Figure 3:
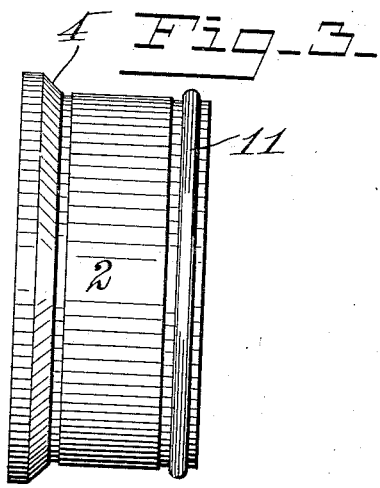

This invention relates to new and useful improvements in roller bearings. The object of the said invention is to provide an efficient bearing of this character that owing to its structural features may be made in the smallest useful sizes as well as in the larger sizes. And a further object is to provide a bearing of this type the parts of which owing to their structural characteristics may be quickly and accurately assembled with no loss of time. In the accompanying drawings which illustrate our improved roller bearing, Figure 1 is a sectional view on the line 1—1 of Fig. 2. Fig. 2 is a sectional view on the line 2—2 of Fig. 1, and Fig. 3 is a view of the inner shell removed from the assembled parts as shown in Fig. 1.

In a more particular description of our improved roller bearing the drawings are referred to in detail where like reference numerals will denote the same parts.

The numeral 1 designates the outer shell of the bearing while 2 denotes the inner shell one nested within the other. Both of said shells have tapered surfaces 3 and 4 which lie opposite each other when the parts of the bearing are assembled and meet the end thrusts of the rollers 5, said rollers being similarly formed with tapered ends 6. The said rollers 5 are assembled and retained in a cage 7 the opposite ends of which have inwardly and outwardly extended flanges 9 and 8, the outwardly lying flange 8 being essentially of greater diameter than the inward flange for a purpose presently to appear. The said cage also has lips 10 extending from the sides of the roller openings to inclose the sides of the rollers and thereby hold them in the cage when the rollers and the cage are assembled. The inner shell 2 has a circumferential bead 11 around the side thereof near the end having the smaller exterior diameter. The said bead 11 serves as a retaining element when the cage and the inner shell with the rollers are assembled, this maintained relation being effected through the said bead acting as an obstruction to the passage of the cage off the smaller end of the shell. The said bead 11 lies a sufficient distance from the ends of the rollers to be at all times free from contact therewith so that while providing means for maintaining the roller cage and the inner shell together the said bead 11 is also free from any contact with the rollers as well as being free from any contact with the cage. The outer shell has a clearance cut 12 on the interior thereof which has a material advantage in assembling. The flange 8 coöperates with this clearance cut by entering the same as shown in Fig. 2.

It will be noted that the flange 8 extends somewhat beyond the race surface of the said outer shell, therefore the cage with the rollers cannot be inserted in an incorrect way. In other words, the assembling of the parts can only be done in the right way as shown in Fig. 2. In assembling the parts of the bearing the cage is first placed in position over the inner shell and the lips 10 are spread along the sides of the rollers, the rollers having been next placed in position. After the rollers have thus been placed in position and secured, the rollers and cage with the inner shell are slipped in the outer shell with the flange 9 foremost.

Having described our invention, we claim:

A roller bearing comprising inner and outer shells having oppositely disposed tapered end thrust bearing surfaces, the inner shell having a circumferential integral bead semicircular in cross section adjacent to the end thereof having a smaller exterior diameter, said bead being beyond the tapered bearing surface of the outer shell, the outer shell having a circumferential clearance cut on the interior thereof at one end, a cage between said inner and outer shells, rollers therein having tapered ends, said rollers engaging the inner and outer shells, and the tapered ends thereof engaging the tapered end thrust bearing surfaces of the said shells, said cage having an end flange of greater diameter than the bearing surface of the outer shell and lying within the clearance cut of said outer shell when the bearing parts are assembled.

In testimony whereof we affix our signatures.

BURT E. DOHNER.
ALBERT J. HUFF.